United States Patent [19]
Sadowski

[11] Patent Number: 6,160,589
[45] Date of Patent: Dec. 12, 2000

[54] VIDEO FRAME DETECTOR READILY ADAPTABLE TO VIDEO SIGNAL FORMATS WITHOUT MANUAL PROGRAMMING AND METHOD FOR SAME

[75] Inventor: Greg Sadowski, Santa Clara, Calif.

[73] Assignee: Silicon Graphics, Inc., Mountain View, Calif.

[21] Appl. No.: 08/998,979

[22] Filed: Dec. 29, 1997

[51] Int. Cl.$^7$ ............................... H04N 5/08; H04N 5/46

[52] U.S. Cl. ........................................... 348/526; 348/558

[58] Field of Search ..................................... 348/558, 500, 348/526, 513, 521, 524, 469, 529, 441, 552, 555, 525, 527; H04N 5/08, 9/475, 5/46

[56] References Cited

U.S. PATENT DOCUMENTS

| | | | |
|---|---|---|---|
| 5,012,339 | 4/1991 | Kurata et al. | 348/526 |
| 5,608,461 | 3/1997 | Sadowski et al. | 348/526 |

*Primary Examiner*—Sherrie Hsia
*Attorney, Agent, or Firm*—Wagner Murabito & Hao LLP

[57] ABSTRACT

A video frame detector circuit used in synchronizing one video signal with another video signal. The video frame detector of the present invention is able to automatically detect a start of frame portion of any video composite synchronization signal connected to it without requiring programming. The start of frame commences with the least frequent vertical field, or if all fields are equally frequent, a deterministic process is used to promote one of the fields to be the start of the frame. Since the video frame detector circuit of the present invention does not require programming to recognize various video signal formats, it readily adapts to different video signal conditions with little or no manual intervention. The video frame detector contains a number of memory stores for storing previously detected video patterns obtained from a composite synchronization signal. Once a current pattern is ascertained from the composite synchronization signal, it is compared against the stored patterns. Information regarding recognized patterns is stored in a history FIFO. New patterns are stored in vacant memories replacing those stored patterns that are most frequently seen. Frequency counters maintain information as to the frequency of each stored pattern. A state machine assumes that the least frequently ascertained patterns are the start of frame portion and generates a start of frame pulse accordingly. The start of frame pulse can be delayed to properly align with the video signal.

20 Claims, 8 Drawing Sheets

VIDEO FRAME DETECTOR READILY ADAPTABLE TO VIDEO SIGNAL FORMATS WITHOUT MANUAL PROGRAMMING AND METHOD FOR SAME

BACKGROUND OF THE INVENTION

(1) Field of the Invention

The present invention relates to the field of video display systems. More specifically, the present invention relates circuits for synchronizing the video signals from one or more devices.

(2) Prior Art

Multiple video devices are often used together as video sources to produce a resultant video image. One of the video devices can be a graphics computer. Alternatively, one of the video devices can also be any sort of recorded multi-media player, e.g., a CD-ROM player, etc. In linking the video devices, the video devices are required to be synchronized with each other. In most of the video/graphics systems, the devices need to be synchronized together in terms of the vertical and horizontal signal frequencies. Specifically, the signal from one device needs to line up with the signal from the other device for proper video linking.

A synchronizing device, which can reside in one of the video devices, is used for the synchronization. The synchronizing device analyzes the reference synchronization (sync) signal from the other video devices. In order to properly synchronize different video devices, e.g., the output of a graphics computer to the output of a video studio sync signal, every synchronizing device needs to analyze the reference sync signal generated by a video reference device. At a minimum, the devices should be synchronized vertically to maintain the same vertical rate and vertical phase. To synchronize vertically, the synchronizing device needs to ascertain the start of the frame from the video reference signal (of the video signal) using a frame detector. This video reference signal is also called the composite sync signal and is a train of pulses of different widths as well as different time intervals between the pulses. In this composite signal, there are pulses marking the start of the horizontal lines and a number of pulses of different duration and time between them are used for marking the start of the video frame and fields. The start of frame information is used to synchronize the video signals.

One prior art synchronizing device detects the start of a frame by looking for serration pulses after the equalization pulse. However, this prior art device is "hard wired" and only accepts a limited number of video formats. For all "hard wired" start of frame detectors, when new video formats are developed, the prior art synchronizing device is unable to handle the new format because it is not adaptable. For each new video format, new circuitry is made and a new synchronizing device needs to be developed. For instance, certain circuits of this prior art technique are designed for recognizing only NTSC and PAL formats. Using this approach, for a single synchronization circuit to handle multiple video formats, the circuit needs to contain many sub-circuits with each sub-circuit being custom built for a particular video signal format. This prior art technique for performing video synchronizing leads is a very costly and complex solution.

Another prior art synchronizing device is described in U.S. Pat. No. 5,608,461 issued on Mar. 4, 1997 by G. Sadowski, et al., and includes a programmable mechanism whereby known signal patterns can be manually programmed into a memory. Within the programmable mechanism, the synchronization circuit can be programmed to recognize the start of frame signal for a given video format. Although this prior art mechanism is more robust compared to the "hard wired" design described above, it nevertheless requires that the synchronization circuit be manually programmed to recognize each new video format. Programming typically requires manual attention to the video equipment which requires a good deal of computer hardware and software support to implement and maintain. This approach is also error prone, can be costly over time and can result in unnecessary intrusion into the video equipment.

A variety of video formats do exist in the video technology arena and the encoding technique of the start of frame in the composite sync signal is different from one video format to another. Further, it is expected that over time a variety of new video formats will be developed, each having different start frame encoding techniques. At the same time, it would be desirable to have just one circuit capable of providing signal synchronization for all of the video formats without requiring programming each time a new video format or standard is made available.

Accordingly, the present invention offers a video frame detector circuit that is capable of providing synchronization for a variety of video signal formats without requiring programming a priori. These and other advantageous of the present invention not specifically described above will become clear within discussions of the present invention herein.

SUMMARY OF THE INVENTION

A video frame detector circuit is described herein and is used in synchronizing one video signal with another video signal. The video frame detector of the present invention is able to automatically detect a start of frame portion of any video composite synchronization signal connected to it without requiring programming. The start of frame commences with the least frequent vertical field, or if all fields are equally frequent, a deterministic process is used to promote one of the fields to be the start of the frame. Since the video frame detector circuit of the present invention does not require programming to recognize various video signal formats, it readily adapts to different video signal conditions with little or no manual intervention. The video frame detector contains a number of memory stores for storing detected video patterns previously obtained from a composite synchronization signal. Once a current pattern is ascertained from the composite synchronization signal, it is compared against the stored patterns. Information regarding recognized patterns is stored in a history FIFO. New patterns are stored in vacant memories replacing those stored patterns that are most frequently seen. Frequency counters are coupled to the history FIFO and maintain information as to the frequency of each stored pattern. A state machine assumes that the least frequently ascertained patterns are the start of frame portion and generates a start of frame pulse accordingly when these patterns are seen. The start of frame pulse can be delayed to properly align with the video signal.

Specifically, one embodiment of the present invention includes a video frame detector circuit readily adaptable to video signal formats including: a synchronization analyzer circuit for ascertaining a current signal pattern from a composite synchronization video signal; a memory circuit for storing previously ascertained signal patterns; comparator circuits for comparing the current signal pattern with each stored signal pattern of the memory circuit for recognizing the current signal pattern; a state machine circuit for controlling the storage of the current signal pattern into the memory circuit provided the current signal pattern is not recognized by the comparator circuits wherein the state machine circuit is also for replacing the most frequently ascertained signal pattern of the memory circuit with the current signal pattern provided the current signal pattern is not recognized by the comparator circuit and provided further the memory circuit is full; a frequency pattern counter circuit for maintaining the frequency that each stored signal pattern is ascertained from the composite synchronization video signal; and wherein the state machine circuit is also for generating a start of frame signal provided the current signal pattern is identified as being a least frequently ascertained pattern with respect to the stored signal patterns of the memory circuit.

Another embodiment of the present invention includes the above and further including a delay circuit coupled to the state machine circuit for delaying the start of frame signal until a start of a next video frame.

DETAILED DESCRIPTION OF THE INVENTION

In the following detailed description of the present invention, a start of frame video detector circuit readily adaptable to detect start of frame signals within new video signal formats without requiring advance pattern programming, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

Figure 1A:
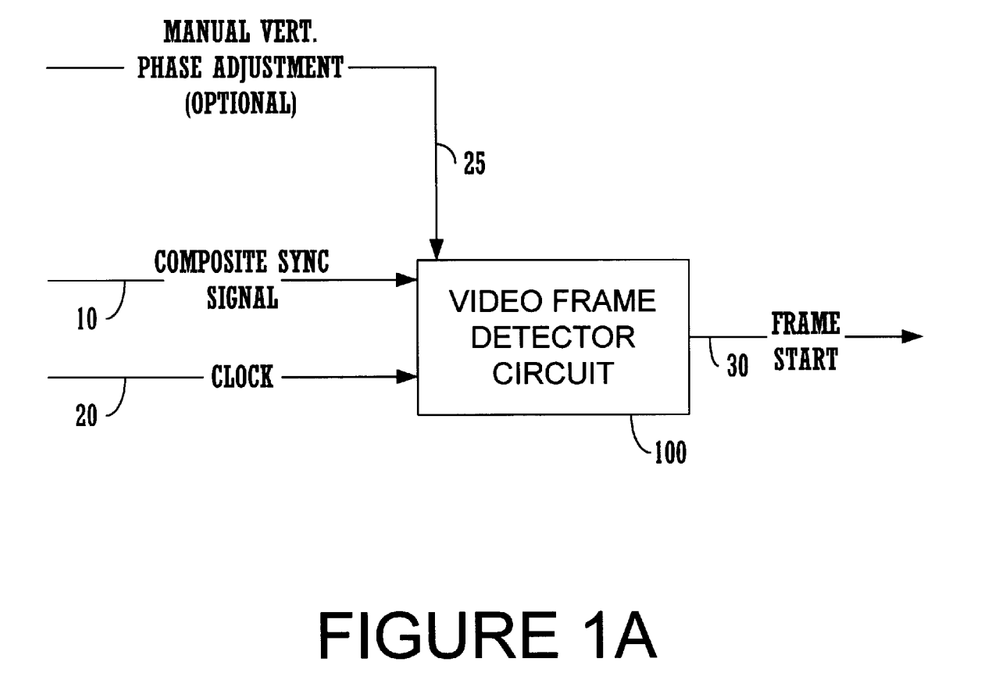
FIG. 1A illustrates a high level block diagram of the video frame detector circuit in accordance with the present invention.

With reference to FIG. 1A, a high level block diagram of the video frame detector circuit 100 of the present invention is illustrated. The video frame detector circuit 100 receives as input a composite synchronization signal (synchronization signal) over line 10 and also a clock signal over line 20. A variety of clock signal frequencies can be used in accordance with the present invention and in one embodiment an exemplary frequency of 50 MHz is used for the clock signal. The video frame detector circuit 100 generates a start of video frame signal over line 30 upon the detection of the start of a video frame within the synchronization signal of line 10. Also, video equipment and computer display outputs can have different vertical delays (e.g., the start of frame can vary) when synchronized together. Because of this, a common manual vertical phase adjustment 25 can be added within an embodiment of the present invention.

As described above, in the mixing and synchronization of various video signals from various sources, it is important to detect the start of a video frame with respect to video signals of various formats. The video frame detector circuit 100 of the present invention provides such start of frame detection information using the frame start signal of line 30. The video frame detector circuit 100, as described in more detail below, is adaptable to new video signal formats without requiring any advance pattern programming as required of the prior art.

Generally, a video signal contains horizontal synchronization pulses that synchronize the refresh of individual rows of a display screen in either interlaced or non-interlaced video signal formats. The vertical refresh (also called vertical synchronization pulse) indicates a start of a frame or field and can also be referred to as the frame start or start of frame synchronization signal. In some video signal formats, two fields comprise a frame. In interlaced video signal formats, a first field contains odd rows and a second field can contains even rows, or vice-versa. In non-interlaced video signal formats, a first field can correspond to the rows of the top of the display screen and the second field can correspond to the rows of the bottom of the display screen. Video frames are presented typically at a rate of 30–80 Hz to a display screen or panel.

Figure 1B:
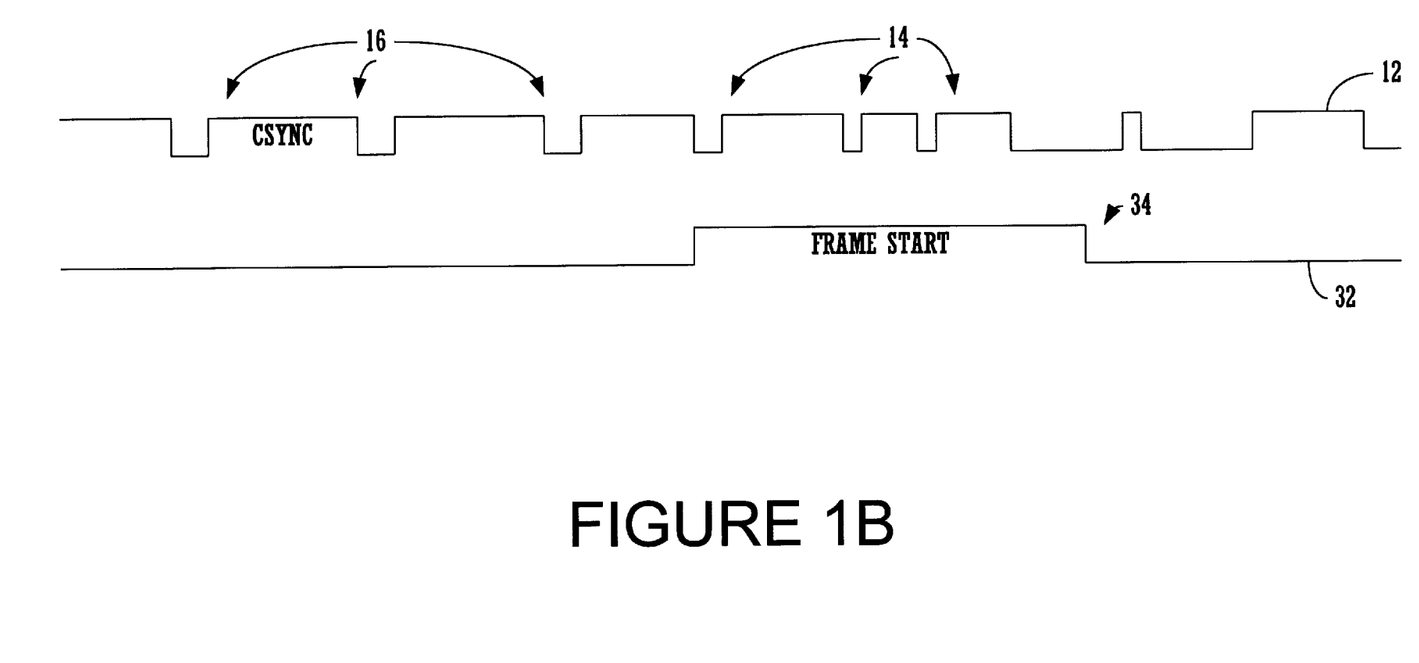
FIG. 1B shows timing diagrams of a composite synchronization ("csync") signal and a frame start ("start of frame") signal in accordance with the present invention.

FIG. 1B illustrates timing diagrams of an exemplary synchronization signal 12 ("csync") of line 10 and of the frame start or "start of frame" signal 32 of line 30. In accordance with the present invention, video frame detector circuit 100 examines the synchronization signal 12 to determine signal patterns that appear infrequently and characterizes these infrequently ascertained patterns as start of frame indicators. This technique is applied to all video signal formats. As seen in FIG. 1B, the signal pattern 14 appears less frequently within signal 12 compared to the signal pattern 16. In this exemplary case, the present invention generates a start of frame pulse 34 in response to signal pattern 14. Signal pulse 34 is generated by video frame detector circuit 100 to indicate the commencement of a new video frame for the video signal associated with synchronization signal 12. A frame typically starts with the least frequent vertical field, or if all fields are equally frequent, a deterministic process is used by the present invention to promote one of the fields to be the beginning of the video frame. However, no pattern programming is required in the present invention.

Using the above technique, the video frame detector circuit 100 is able to readily adapt and be compatible with a variety of video signal formats (e.g., NTSC, PAL, field sequential 3 fields, block sync format, RS343, SMPTE240M, SMPTE295M, etc.) without requiring any advance format-specific pattern programming.

Figure 2:
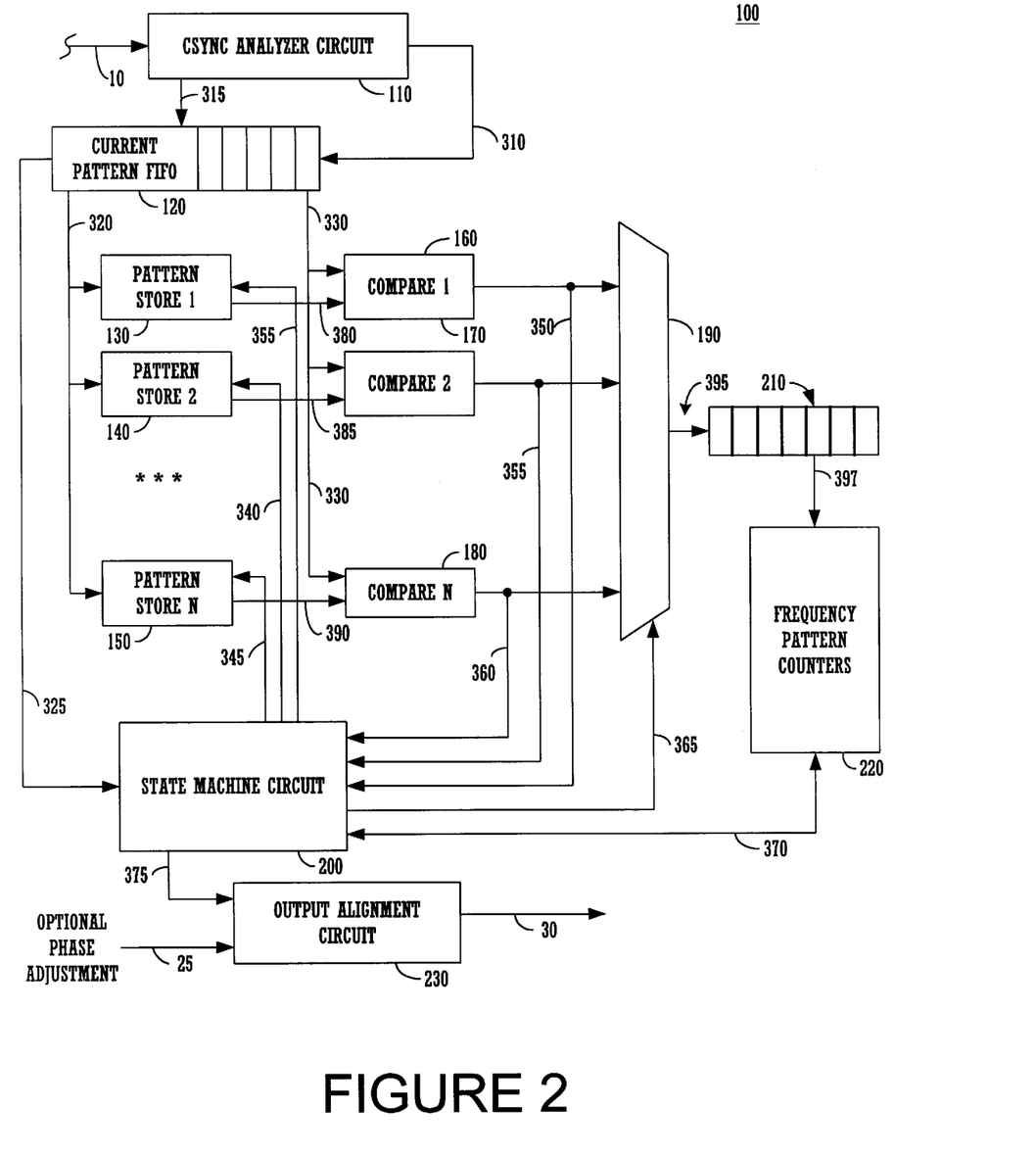
FIG. 2 is a schematic diagram of the video frame detector circuit in accordance with the present invention.

FIG. 2 illustrates circuitry used within the video frame detector circuit 100 in accordance with one embodiment of the present invention. The composite synchronization signal over line 10 is coupled to a synchronization analyzer circuit 110 which contains two pulse duration difference circuits, one for analyzing the high pulses and another for the low pulses. The synchronization analyzer circuit 110 is described in more detail with respect to FIG. 3A. The synchronization analyzer circuit 110 of FIG. 2 analyzes the synchronization signal received over line 10 and characterizes adjacent pulse widths to produce a multi-bit value which is output over line 310. Each multi-bit value is relevant for a small predetermined signal window. In one embodiment, two consecutive pulse widths of the same polarity are used to generate a respective three bit value over line 310. A pulse over line 315 indicates a new multi-bit value ready over line 310.

Each multi-bit value generated over line 310 is stored into a first-in-first-out (FIFO) memory circuit 120 ("FIFO memory 120"). The signal pattern stored in FIFO memory 120 is called the "current signal pattern." A number of multi-bit values are used to represent a current signal pattern of the synchronization signal of line 10. In one embodiment, 40 multi-bit values are used, but this number is arbitrary and can be increased or decreased depending on memory resource availability and expected circuit performance constraints, etc. In one embodiment, the multi-bit values are each three bits, therefore 40×3 requires at least 120 bits of storage for FIFO memory 120. When a new multi-bit value is produced by circuit 110, a pulse over line 315 is generated from circuit 110 to the FIFO memory 120 to indicate the new data for storage. When the current signal pattern has been completely stored within FIFO memory 120, a pulse over line 325 is generated to a state machine circuit 200 to indicate that the current signal pattern has been fully ascertained. This signal also initiates comparator circuits 160, 170, 180 as described below.

Within FIG. 2, a number of FIFO pattern memories 130, 140 and 150 are provided for storing signal patterns that were previously ascertained by circuit 110. As shown in FIG. 2, N pattern memories are provided, however, N can be equal to two in one embodiment. Again, the value of N can be increased or decreased depending on memory resource availability and expected circuit performance constraints, etc. Also, the FIFO pattern memories 130, 140 and 150 can be integrated into a single memory array in one embodiment. Signal line 320 is used for transferring the current signal pattern from FIFO memory 120 to one of the pattern memories 130, 140, 150 for storage. It is appreciated that the pattern memories 130, 140, 150 store previously ascertained signal patterns.

Each pattern memory of 130, 140, 150 has provided for it an associated comparator circuit. The comparator circuits 160, 170 and 180 serve to respectively compare the valid contents of the pattern memories 130, 140 and 150 against the current signal pattern of FIFO memory 120. A comparison operation is not performed for a pattern memory that is vacant. Specifically, comparator 160 receives input over common bus 330 and also over bus 380 and thereby is able to compare the contents of FIFO memory 120 versus the contents of FIFO memory 130 (store 1). Comparator 170 receives input over common bus 330 and also over bus 385 and thereby is able to compare the contents of FIFO memory 120 versus the contents of FIFO memory 140 (store 2). Comparator 180 receives input over common bus 330 and also over bus 390 and thereby is able to compare the contents of FIFO memory 120 versus the contents of FIFO memory 150 (store N).

This comparison operation performed by comparator circuits 160, 170, 180 can be performed either in parallel (e.g., all bits of the patterns at once) or in series fashion (e.g., bit by bit). In parallel fashion, performance is increased but at the expense of a larger bus width for buses 330, 380, 385 and 390. Each comparator that registers a match between the signal pattern stored in its associated pattern memory and the current signal pattern of FIFO memory 120 generates a match signal indicating a recognition of the current signal pattern. Comparator 160 generates a match signal over line 350 which is fed to an input of multiplexer 190 and also to the state machine circuit 200. Comparator 170 generates a match signal over line 355 which is fed to an input of multiplexer 190 and also to the state machine circuit 200. Lastly, comparator 180 generates a match signal over line 360 which is fed to an input of multiplexer 190 and also to the state machine circuit 200.

The state machine circuit 200 of FIG. 2 controls the select line 365 of multiplexer 190 to select, as the propagating input, the active match signal. As described further below, the selection process that decides when to store a signal pattern into a pattern memory guarantees that all signal patterns within pattern memories 130, 140, 150 are unique with respect to each other. Therefore, at most only one match signal of lines 350–360 is active at any time. If the current signal pattern of FIFO 120 is not recognized by any of the comparator circuits 160, 170, 180, then no match signal becomes active. The match signal for a respective comparator also signifies the particular pattern memory number (e.g., store 1, store 2, store N) to which it is associated.

The output of multiplexer 190 is generated over line 395 and is captured into history FIFO 210. The output over line 395 is a value that indicates which of the stored signal patterns (by number) matched with the current signal pattern. In one embodiment, the value is based on the pattern FIFO number that matched. For instance, if a stored signal pattern of FIFO memory 130 matched, then the value produced at line 395 is "1" and if a stored signal pattern of FIFO memory 140 matched, then the value produced at line 395 is "2" and similarly a stored signal pattern of FIFO memory 150 matched, then the value produced at line 395 is "N." Therefore, the history FIFO 210 maintains a small window of information indicating which signal patterns were last ascertained by circuit 110.

The video frame detector circuit 100 of FIG. 2 also contains a number of frequency pattern counters contained within circuit 220. Circuit 220 is coupled to history FIFO memory 210 through Line 397. Each signal pattern stored within a pattern memory of 130, 140, 150, has an associated pattern counter circuit that is updated each time its associated number is seen in a slot of the history FIFO memory 210. Circuit 220 is coupled to history FIFO memory 210 such that the pattern frequency counters can inspect and analyze the contents of the history FIFO memory 210 in order to perform their frequency counting operations. At any time, the frequency pattern counters of circuit 220 can be queried by the state machine circuit 200 over bi-directional bus 370 to obtain the current frequency count for a stored signal pattern. The state machine circuit 200 is aware of all signal patterns stored in the pattern memory FIFOs 130, 140, 150.

The comparator circuits 160, 170 and 180 utilize the pulse over line 320 to indicate when to commence their comparison operations. At the completion of a comparison, if no match signal of lines 350–360 has been asserted, then the state machine circuit 200 assumes the current signal pattern is unrecognized. At this time, the state machine circuit 200 using control lines 335, 340 and 345 controls the storage of the current signal pattern of FIFO memory 120 into a vacant pattern memory using bus 320. If there are no vacant pattern memories, then the state machine circuit 200 controls the storage of the current signal pattern of FIFO memory 120 into the pattern memory that contains the most frequently ascertained signal pattern as recorded by frequency counters of circuit 220. When line 335 is asserted, pattern memory 130 receives the contents of FIFO memory 120 over bus 320. When line 340 is asserted, pattern memory 140 receives the contents of FIFO memory 120 over bus 320. When line 345 is asserted, pattern memory 150 receives the contents of FIFO memory 120 over bus 320.

In general, the video frame detector circuit 100 of the present invention generates a start of frame pulse when it recognizes a least frequently seen signal pattern. If the counter circuits 160, 170, 180 of FIG. 2 generate a match signal in response to the current signal pattern of FIFO 120, then the current signal pattern is recognized. The state machine circuit 200 then determines the frequency that the recognized signal pattern has been ascertained. If the current signal pattern is the least frequently ascertained signal pattern of those stored in the pattern memories 130, 140, 150, then the video frame detector circuit 100 of the present invention determines that the current signal pattern indicates a start of frame. In response, the state machine circuit 200 generates a start of frame signal over line 375.

The comparison operations, pattern frequency counter operations and other analysis operations of the video frame detector circuit 100 require some time to complete after obtaining the current signal pattern. In those embodiments of the present invention where this time cannot be ignored, an otherwise optional output alignment circuit 230 is provided. The output alignment circuit 230 delays the start of frame signal 375 generated by state machine circuit 200 so that it coincides with the start of a next frame of the video signal. This slightly delayed start of frame signal is then output over line 30 as the start of frame signal. As discussed above, if the time delay of video frame detector circuit 100 is such that it can be ignored, then line 375 can be coupled directly to line 30 thereby obviating the need for the output alignment circuit 230. Also, a manual vertical phase adjustment can be used.

Figure 3A:
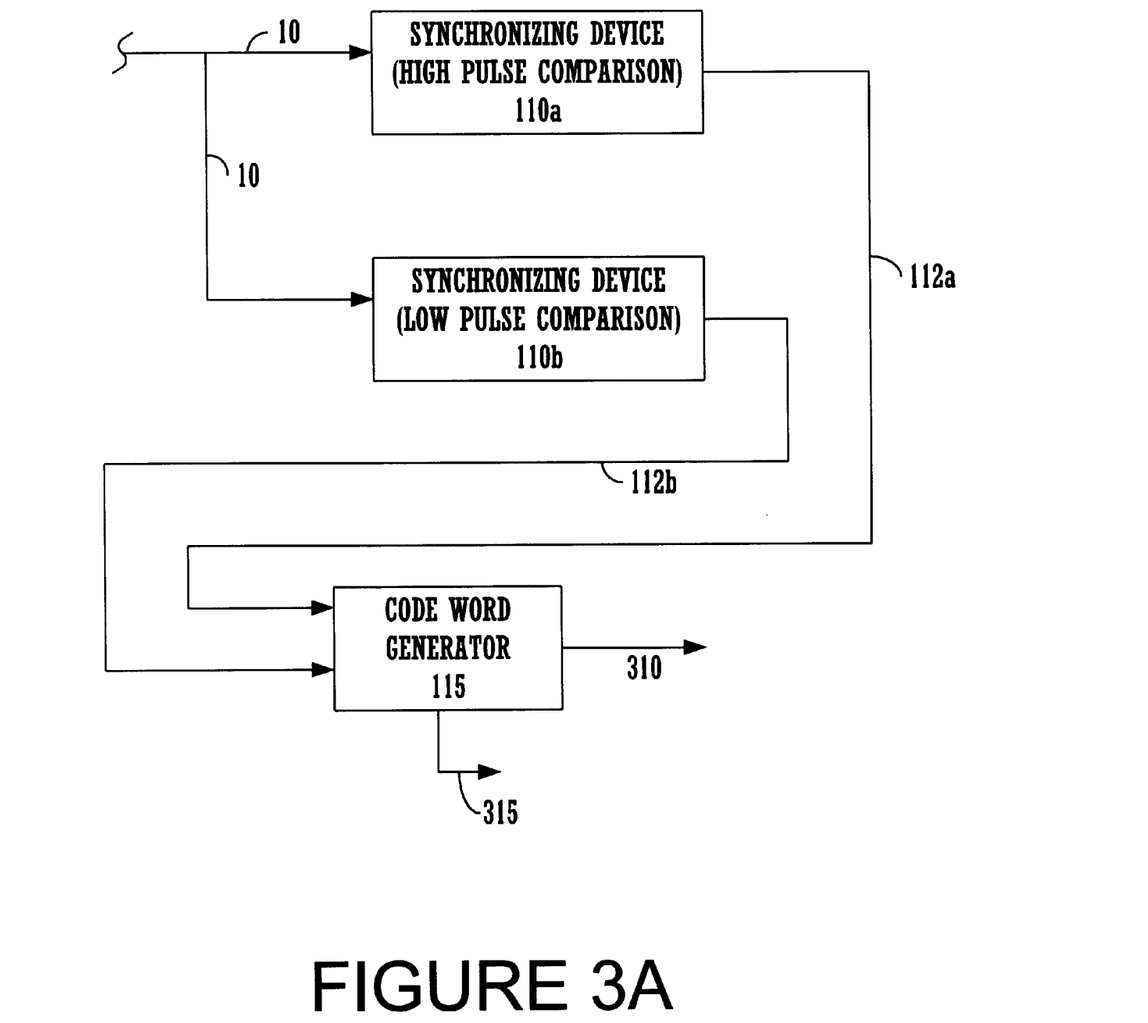
FIG. 3A illustrates a block diagram of circuitry of the composite synchronization analyzer circuit of the present invention.

FIG. 3A illustrates the contents of the synchronization analyzer circuit 110 in accordance with one embodiment of the present invention. Synchronization analyzer circuit 110 contains a first duration difference circuit 110a for analyzing adjacent pulse widths of high signals of the synchronization signal of line 10. Synchronization analyzer circuit 110 also contains a second duration difference circuit 110b for analyzing adjacent pulse widths of low signals of the synchronization signal of line 10. In one embodiment, a current and a previous pulse width are compared by circuits 110a and 110b and each circuit produces a respective result. It is appreciated that only one result is produced at any given time, with circuit 110a producing a result at the completion of each high pulse and circuit 110b producing a result at the completion of each low pulse.

Figure 3B:
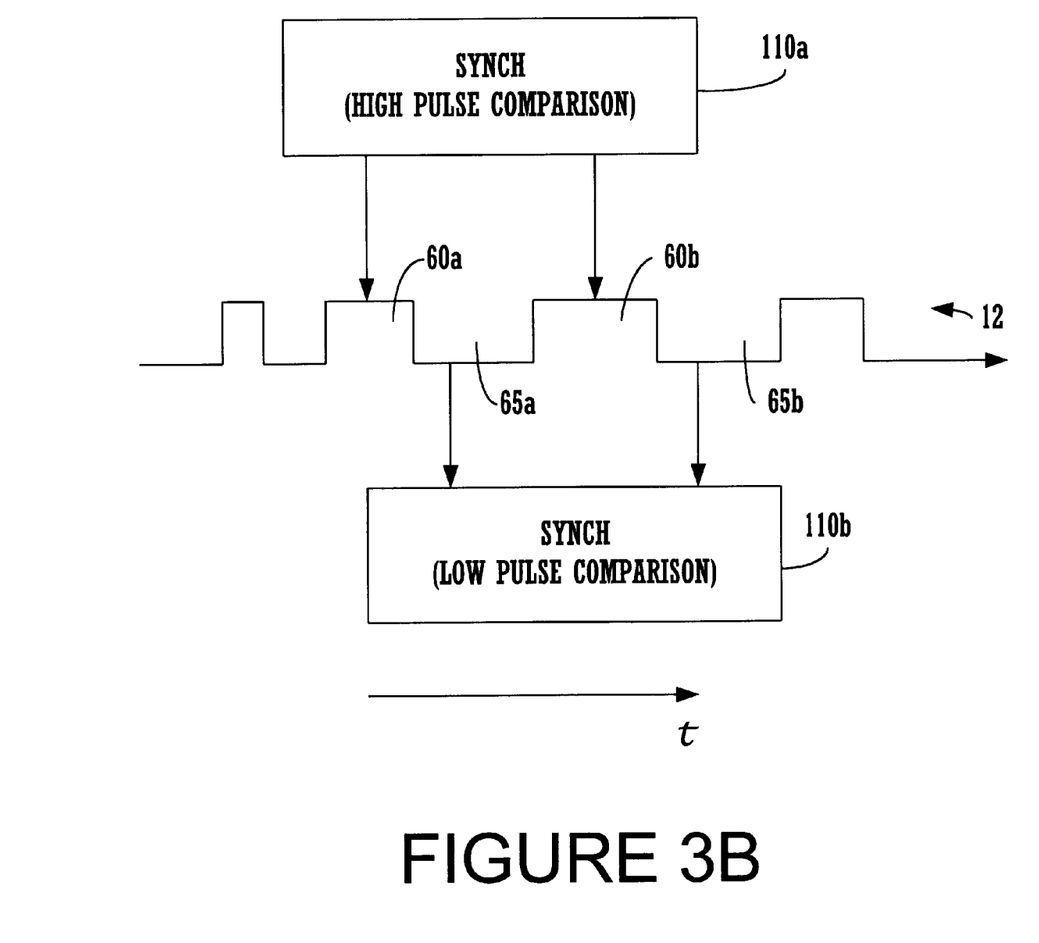
FIG. 3B illustrates the pulse portions of the composite synchronization signal that are analyzed by the high and low pulse width duration circuits in accordance with the present invention.

FIG. 3B illustrates a timing diagram of the synchronization signal 12 over line 10 and the high and low pulses that are compared by circuits 110a and 110b. Circuit 110a compares the pulse widths of current high pulse 60b and previous high pulse 60a. Pulse width difference circuit 110a generates a first value if the pulse width of current pulse 60b is equal to the pulse width of previous pulse 60a. Circuit 110a generates a second value if the pulse width of current pulse 60b is greater than the pulse width of previous pulse 60a. Circuit 110a generates a third value if the pulse width of current pulse 60b is less than the pulse width of previous pulse 60a. Likewise, pulse width difference circuit 110b compares the pulse widths of current low pulse 65b and previous low pulse 65a. Circuit 110b generates a first value if the pulse width of current pulse 65b is equal to the pulse width of previous pulse 65a. Circuit 110b generates a second value if the pulse width of current pulse 65b is greater than the pulse width of previous pulse 65a. Circuit 110b generates a third value if the pulse width of current pulse 65b is less than the pulse width of previous pulse 65a.

Although a number of different circuits and techniques can be utilized for performing the above pulse differencing operations of circuits 110a and 110b, in one embodiment of the present invention, circuits 110a and 110b can be implemented as described in U.S. Pat. No. 5,608,461 issued on Mar. 4, 1997, by Sadowski et al., and assigned to the assignee of the present invention and which is hereby incorporated by reference.

With reference to FIG. 3A, the multi-bit results of circuit 110a are transmitted over line 112a to a code word generator circuit 115. The multi-bit results of circuit 110b are also transmitted over line 112b to the code word generator circuit 115. Code word generator circuit 115 transforms the results from lines 112a and 112b into a multi-bit value which is generated over bus 310 and stored into FIFO 120. In one embodiment, the multi-bit values having an "equal" designation are ignored by FIFO memory 120. Each time a new multi-bit value is generated over bus 310, a pulse over line 315 is generated to indicate the new comparison result. Several multi-bit values are used to represent an individual signal pattern. Although a number of different encoding schemes can be used within the present invention, one embodiment utilizes a three bit value to represent each individual encoding. One bit (bit2) represents whether the high or low pulse duration comparator circuit 110a or 110b generated the data and the second two bits (bit1 and bit0) represent the comparison result. Table I below illustrates the encoding used by one embodiment of the present invention.

TABLE I

| Multi-Bit Value | | | |
|---|---|---|---|
| Bit2 | Bit1 | Bit0 | Description |
| 0 | 0 | 0 | Low Pulse, Current = Previous |
| 0 | 0 | 1 | Low Pulse, Current < Previous |
| 0 | 1 | 0 | Low Pulse, Current > Previous |
| 1 | 0 | 0 | High Pulse, Current = Previous |
| 1 | 0 | 1 | High Pulse, Current < Previous |
| 1 | 1 | 0 | High Pulse, Current > Previous |

Figure 4:
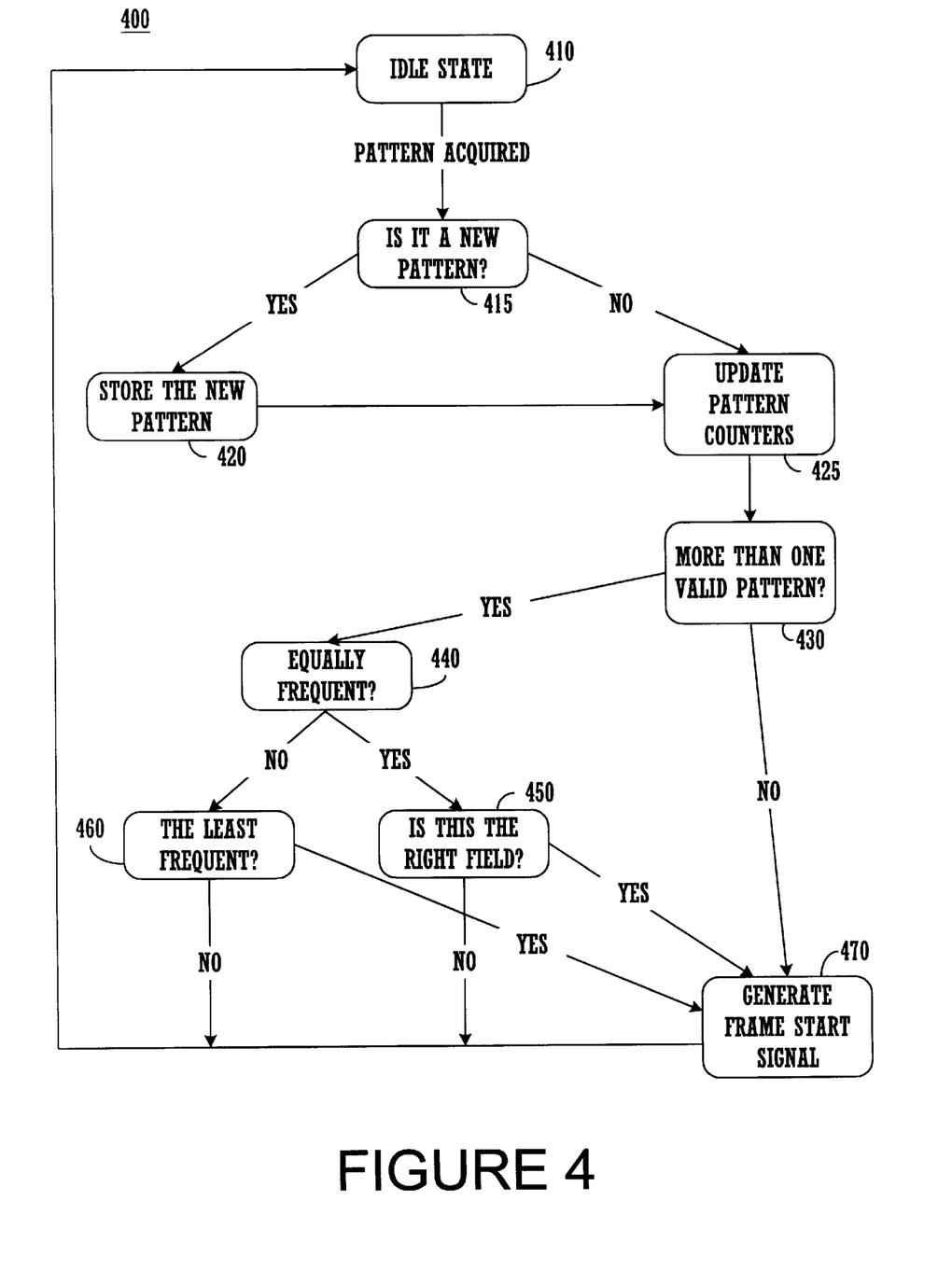
FIG. 4 illustrates a state diagram of the states traversed by the state machine controller circuit of the video frame detector circuit of the present invention.

FIG. 4 illustrates a state diagram 400 of the control states that are traversed by the state machine controller circuit 200 of FIG. 2 within the video frame detector circuit 100 in accordance with the present invention. It is appreciated that one of ordinary skill in the art could readily implement the logic required to realize state machine circuit 200 based on its description herein. In one embodiment, a properly programmed memory circuit can be utilized to realize the state transitions of state machine circuit 200.

State 410 of FIG. 4 is the idle state and when a current signal pattern has been acquired by circuit 110, a signal from line 325 places the state machine circuit 200 into state 415.

At state 415, the state machine circuit 200 examines the match signals from lines 350, 355, 360 to determine if no match signals are present. If no match signals are present, then the current signal pattern is new and state 420 is entered. If one match signal is asserted, then the current signal pattern is not new and state 425 is entered.

At state 420 of FIG. 4, the state machine circuit 200 stores the current signal pattern into one of the pattern memories 130, 140, 150. Vacant pattern memories are selected first. If no vacancies exist, the state machine circuit 200 queries the frequency pattern counters of circuit 220 to determine the stored signal pattern having the most frequency. This is the least interesting of the stored signal patterns from a start of frame detection point of view. If no vacancies within the pattern memories exist, the stored signal pattern having the most frequency is then replaced by the current signal pattern at state 420. The state machine circuit 200 utilizes control lines 335, 340 and 345 (FIG. 2) to control the above storing operations. After state 420, state 425 is entered.

Figure 6A:
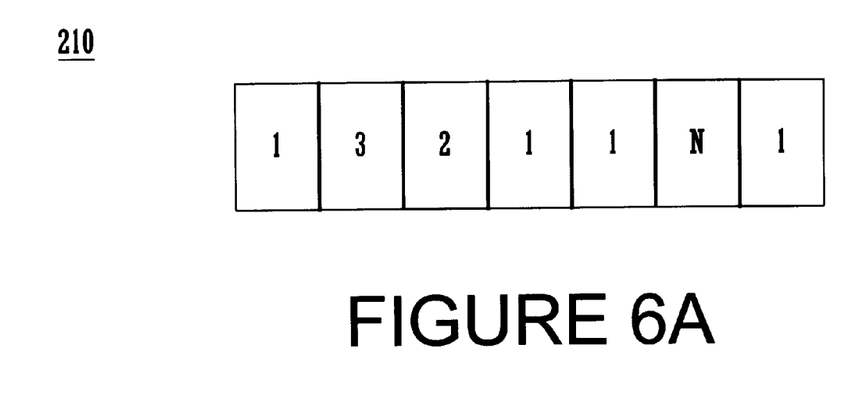
FIG. 6A illustrates exemplary contents of the history FIFO in accordance with the present invention.

At state 425, the left-most contents of the history FIFO 210 are updated based on the result of the comparison operation or based on the pattern memory that received the current signal pattern in the case state 420 was just processed. When updated, the contents of history FIFO 210 are shifted right by one position. As stated above, the history FIFO 210 is updated based on the memory number of the pattern memory matching the current signal pattern. FIG. 6A illustrates a snap shot of the contents of history FIFO 210 in an exemplary case. As shown, signal pattern 1 was recognized followed by N, by 1, by 1 by 2, by 3 and most recently by pattern 1 again. The signal pattern stored in pattern memory 1 is therefore the most frequent signal pattern of this exemplary window. Also at state 425, based on the updated history FIFO 210, the frequency pattern counters of circuit 220 are also updated.

Figure 6B:
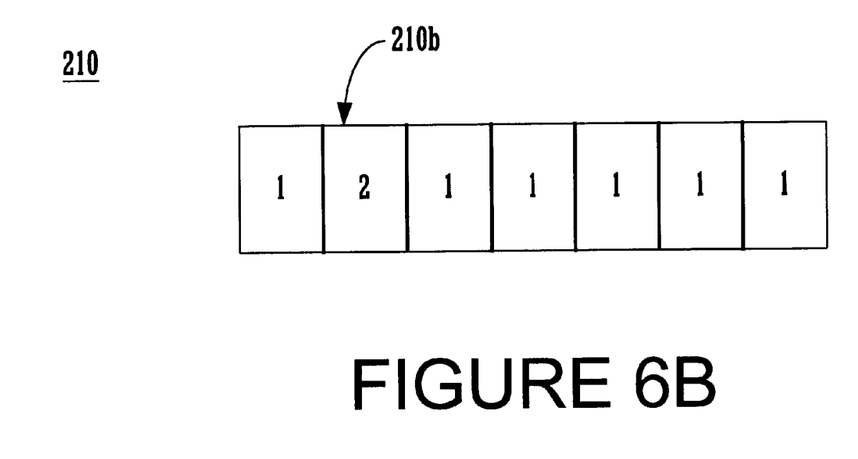
FIG. 6B illustrates exemplary contents of the history FIFO in accordance with the present invention.

At state 430 of FIG. 4, the state machine circuit 200 determines if more than one valid pattern is stored in the history FIFO 210. In one embodiment of the present invention, for a signal pattern to be valid, it needs to exist within the history FIFO 210 in at least i number of slots, where i is 2 in one implementation, as shown at 210*b* of FIG. 6B. If the current signal pattern is not valid, then it does not previously exist within the history FIFO 210 and is therefore not frequent. Therefore, state 470 is entered in this case and a start of frame signal is generated by the state machine circuit 200 over line 375. If more than one valid patterns exist at state 430, then state 440 is entered. FIG. 6B illustrates exemplary contents of history FIFO 210 in which signal pattern "1" has more than one valid patterns.

At state 440, the state machine circuit 220 examines the frequency pattern counters of circuit 220 to check if there are signal patterns with equal frequency to the current signal pattern. If not, state 460 is entered and if so, state 450 is entered. At state 460, the state machine circuit 200 checks if the current signal pattern is the least frequent signal pattern and if so, state 470 is entered to generate a frame start signal over line 375. At state 460, if the current signal pattern is not the least frequent signal pattern, then state 410 is re-entered.

At state 450 of FIG. 4, if the current signal pattern is equally frequent with respect to another signal pattern, then the current signal pattern could be associated with one field of a frame. In this case, a deterministic process is performed which selects one of the fields as the "proper" field. In one embodiment of the present invention, a check is made at state 450 of the first bit of the signal patterns at issue. If the first bit is of a first value, then that field is selected over the other field. If the first bit is not the first value, then the other field is selected as the "proper" field. If the first bits of the signal patterns are the same, then at step 450, the second bits of each are checked (as described above) until a difference in the signal patterns is discovered. When the "proper" field is identified as the current signal pattern, then state 470 is entered to generate a start of frame signal over line 375, otherwise state 410 is entered.

In some instances, the detection of the start of frame by video frame detector 100 can occur a certain delay period after it actually happened. In the cases in which this delay period cannot be ignored, the output alignment circuit 230 of FIG. 2 is provided. The output alignment circuit 230 delays the start of frame signal of line 375 until the next expected video frame. In this manner, the actual start of frame signal at line 30 is therefore always aligned with the first edge of the vertical pattern of the synchronization signal of line 10.

Figure 5:
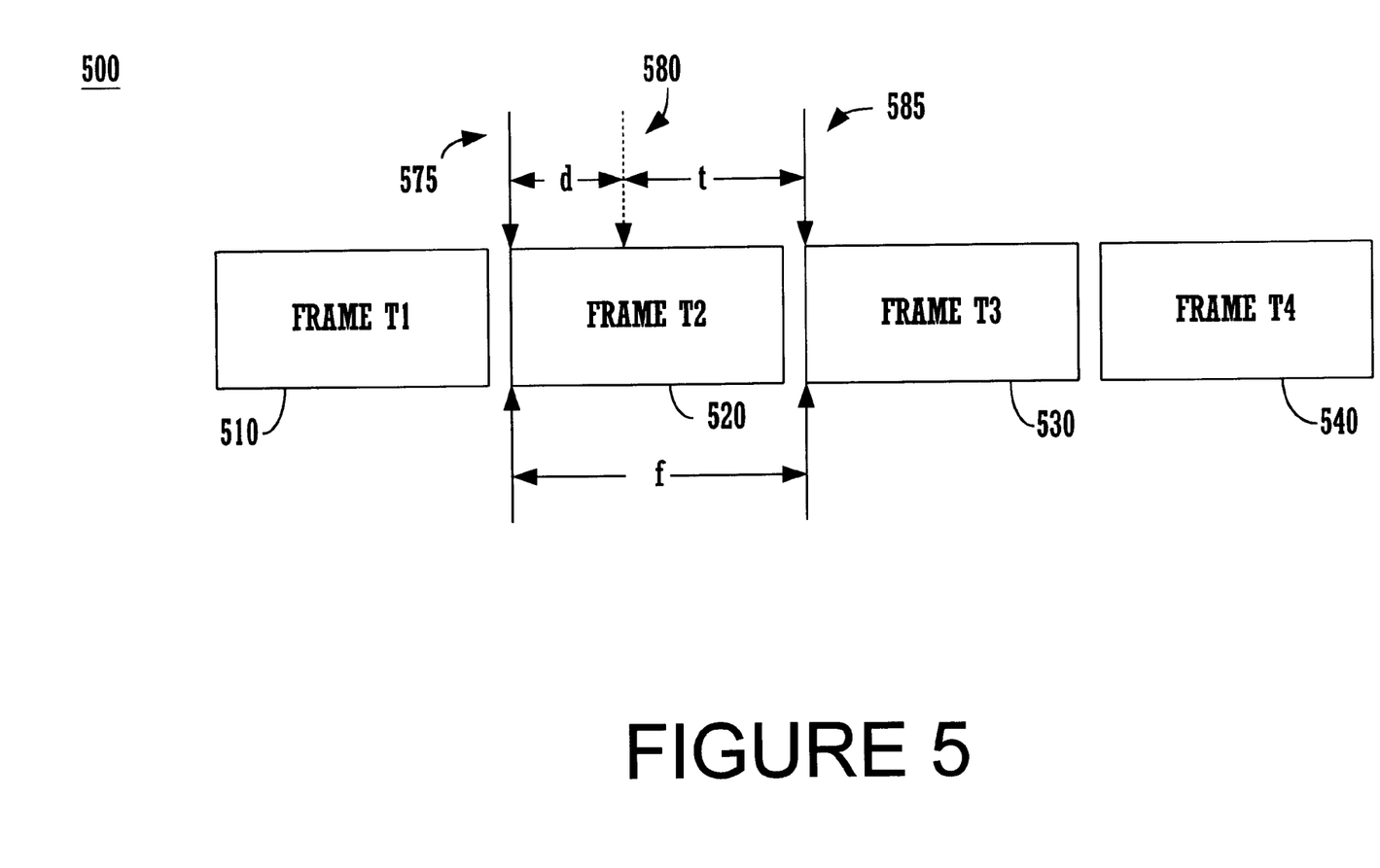
FIG. 5 is a timing diagram illustrating a timing delay introduced to the start of frame signal generated by the state machine circuit of the video frame detector circuit of the present invention for proper timing alignment with the video signal.

FIG. 5 illustrates a timing diagram 500 of the delay period added by the output alignment circuit 230. An exemplary sequence of four sequential video frames are shown as 510, 520, 530 and 540 with video frame 540 being last in time. Arrow 575 represents an actual start of frame for frame 520. However, the state machine circuit 200 detects this start of frame at arrow 580, a time delay, d, later after the frame 520 actually starts. After having determined at least two start of frames, the state machine circuit 200 can determine the time period, f, as shown in FIG. 5, which is the time period between two sequential frames. Therefore, the output alignment circuit 230 effectively delays the start of frame signal at 580 (from the state machine circuit 200) by a period, t, which is computed as shown below:

$$t=f-d$$

In so doing, the start of frame signal generated by the output alignment circuit 230, and corresponding to the start of frame signal at 580, actually appears on line 30 at time point 585 which exactly coincides with the start of frame for frame 530, a next video frame. It is appreciated that manual vertical and horizontal adjustment delays can be added to circuit 230 for fine tuning of the synchronization signal.

In conclusion, the video frame detector circuit of the present invention can effectively recognize signal patterns from a composite video synchronization signal and can perform an analysis on the frequency of the signal patterns. The present invention uses this analysis to determine which signal patterns are infrequent within the synchronization signal and then basis a start of frame signal on this information. Importantly, no advanced programming is required involving format-specific custom signal patterns applicable for particular video signal formats, as required of the prior art. This features makes the present invention extremely adaptable for new video signal formats without requiring any manual, or otherwise, anticipatory programming.

The preferred embodiment of the present invention, a start of frame video detector circuit readily adaptable to detect start of frame signals within new video signal formats without requiring advance pattern programming, is thus described. While the present invention has been described in particular embodiments, it should be appreciated that the present invention should not be construed as limited by such embodiments, but rather construed according to the below claims.

What is claimed is:

1. A video frame detector circuit comprising:

a synchronization analyzer circuit for ascertaining a current signal pattern from a composite synchronization video signal;

a memory circuit for storing previously ascertained signal patterns;

comparator circuits for comparing said current signal pattern with each stored signal pattern of said memory circuit for recognizing said current signal pattern;

a control circuit for controlling the storage of said current signal pattern into said memory circuit provided said current signal pattern is not recognized by said comparator circuits;

a frequency pattern counter circuit for maintaining a frequency that each stored signal pattern is ascertained from said composite synchronization video signal; and wherein said control circuit is also for generating a start of frame signal provided said current signal pattern is identified as being a least frequently ascertained pattern with respect to said stored signal patterns of said memory circuit.

2. A video frame detector circuit as described in claim 1 wherein said control circuit is a state machine circuit.

3. A video frame detector circuit as described in claim 1 wherein said memory circuit comprises a plurality of first-in-first-out (FIFO) memories and wherein each FIFO memory stores a single signal pattern.

4. A video frame detector circuit as described in claim 1 further comprising:

a multiplexer circuit controlled by said control circuit and coupled to receive a respective match signal from each of said comparator circuits; and a history first-in-first-out (FIFO) circuit coupled to receive an output from said multiplexer circuit and coupled to said frequency pattern counter circuit, said history FIFO circuit for maintaining a window of information indicating the characterization of a plurality of signal patterns previously ascertained from said composite synchronization video signal.

5. A video frame detector circuit as described in claim 1 further comprising a current pattern memory circuit for storing said current signal pattern, said current pattern memory circuit coupled to said memory circuit and also coupled to said comparator circuits.

6. A video frame detector circuit as described in claim 1 wherein said synchronization analyzer circuit comprises:

a first circuit for comparing a current high pulse width of said composite synchronization video signal with a previous high pulse width of said composite synchronization video signal and for generating a first result indicating whether said current high pulse width is equal to, greater than, or less than said previous high pulse width; and a second circuit for comparing a current low pulse width of said composite synchronization video signal with a previous low pulse width of said composite synchronization video signal and for generating a second result indicating whether said current low pulse width is equal to, greater than, or less than said previous low pulse width.

7. A video frame detector circuit as described in claim 6 wherein said current signal pattern is represented by combinations of said first and second results.

8. A video frame detector circuit as described in claim 1 further comprising a delay circuit coupled to said control circuit for delaying said start of frame signal until a start of a next video frame.

9. A video frame detector circuit readily adaptable to video signal formats comprising:

a synchronization analyzer circuit for ascertaining a current signal pattern from a composite synchronization video signal;

a memory circuit for storing previously ascertained signal patterns;

comparator circuits for comparing said current signal pattern with each stored signal pattern of said memory circuit for recognizing said current signal pattern;

a state machine circuit for controlling the storage of said current signal pattern into said memory circuit provided said current signal pattern is not recognized by said comparator circuits wherein said state machine circuit is also for replacing the most frequently ascertained signal pattern of said memory circuit with said current signal pattern provided said current signal pattern is not recognized by said comparator circuit and provided further said memory circuit is full;

a frequency pattern counter circuit for maintaining a frequency that each stored signal pattern is ascertained from said composite synchronization video signal; and wherein said state machine circuit is also for generating a start of frame signal provided said current signal pattern is identified as being a least frequently ascertained pattern with respect to said stored signal patterns of said memory circuit.

10. A video frame detector circuit as described in claim 9 wherein said memory circuit comprises a plurality of first-in-first-out (FIFO) memories and wherein each FIFO memory stores a single signal pattern.

11. A video frame detector circuit as described in claim 9 further comprising:

a multiplexer circuit controlled by said state machine circuit and coupled to receive a respective match signal from each of said comparator circuits; and a history first-in-first-out (FIFO) circuit coupled to receive an output from said multiplexer circuit and coupled to said frequency pattern counter circuit, said history FIFO circuit for maintaining a window of information indicating the characterization of a plurality of signal patterns previously ascertained from said composite synchronization video signal.

12. A video frame detector circuit as described in claim 9 further comprising a current pattern memory circuit for storing said current signal pattern, said current pattern memory circuit coupled to said memory circuit and also coupled to said comparator circuits.

13. A video frame detector circuit as described in claim 9 wherein said synchronization analyzer circuit comprises:

a first circuit for comparing a current high pulse width of said composite synchronization video signal with a previous high pulse width of said composite synchronization video signal and for generating a first result indicating whether said current high pulse width is equal to, greater than, or less than said previous high pulse width; and a second circuit for comparing a current low pulse width of said composite synchronization video signal with a previous low pulse width of said composite synchronization video signal and for generating a second result indicating whether said current low pulse width is equal to, greater than, or less than said previous low pulse width.

14. A video frame detector circuit as described in claim 13 wherein said current signal pattern is represented by combinations of said first and second results.

15. A video frame detector circuit as described in claim 9 further comprising a delay circuit coupled to said state machine circuit for delaying said start of frame signal until a start of a next video frame.

16. A method of detecting a video frame from a composite synchronization video signal, said method comprising the steps of:

a) ascertaining a current signal pattern from a composite synchronization video signal;

b) recognizing said current signal pattern by comparing said current signal pattern with any stored signal patterns of a memory circuit;

c) storing said current signal pattern into said memory circuit provided said current signal pattern is not recognized, wherein said step c) replaces the most frequently ascertained signal pattern of said memory circuit with said current signal pattern provided said current signal pattern is not recognized and provided further said memory circuit is full;

d) determining a frequency that step a) ascertains each stored signal pattern of said memory circuit; and e) generating a start of frame signal provided said current signal pattern is identified as being a least frequently ascertained signal pattern with respect to said stored signal patterns of said memory circuit.

17. A method as described in claim 16 wherein said step a) comprises the steps of:

a1) comparing a current high pulse width of said composite synchronization video signal with a previous high pulse width of said composite synchronization video signal and generating a first result indicating whether said current high pulse width is equal to, greater than, or less than said previous high pulse width;

a2) comparing a current low pulse width of said composite synchronization video signal with a previous low pulse width of said composite synchronization video signal and generating a second result indicating whether said current low pulse width is equal to, greater than, or less than said previous low pulse width; and a3) representing said current signal pattern by combinations of said first and second results.

18. A method as described in claim 16 further comprising the step of delaying said start of frame signal until a start of a next video frame.

19. A method as described in claim 16 wherein said step b) comprises the steps of:

b1) storing said current signal pattern into a current signal pattern memory circuit;

b2) using a respective comparator circuit for each stored signal pattern of said memory circuit, generating a plurality of match signals indicating if any of said stored signal patterns matched said current signal pattern; and b3) responsive to said step b2), maintaining a window of information indicating the characterization of a plurality of signal patterns previously ascertained from said composite synchronization video signal.

20. A method as described in claim 19 wherein said step d) comprises the step of analyzing said window of information maintained by step b3) to determine said frequency that step a) ascertains each stored signal pattern of said memory circuit.

* * * * *